United States Patent [19]

Fennern et al.

[11] Patent Number: 5,215,708

[45] Date of Patent: Jun. 1, 1993

[54] REACTOR BUILDING ASSEMBLY AND METHOD OF OPERATION

[75] Inventors: Larry E. Fennern; Harold A. Careway, both of San Jose; Li C. Hsu, Saratoga, all of Calif.

[73] Assignee: General Electric Company, San Jose, Calif.

[21] Appl. No.: 901,308

[22] Filed: Jun. 19, 1992

[51] Int. Cl.$^5$ ............................................. G21C 15/18
[52] U.S. Cl. ................................. 376/293; 376/299
[58] Field of Search ............... 376/293, 299, 298, 314, 376/313

[56] References Cited

U.S. PATENT DOCUMENTS

| | | | |
|---|---|---|---|
| 4,057,464 | 11/1977 | Mair et al. | 376/314 |
| 5,043,135 | 8/1991 | Hunsbedt et al. | 376/299 |
| 5,043,136 | 8/1991 | Hunsbedt et al. | 376/299 |
| 5,049,353 | 9/1991 | Conway et al. | 376/293 |
| 5,078,960 | 1/1992 | Berg et al. | 376/314 |

OTHER PUBLICATIONS

General Electric Co., "BWR/6 General Description of a Boiling Water Reactor," Sep. 1980, pp. i, ii, 1-1, 1-2, 5-1 to 5-8, 7-1 to 7-6; Publication-restricted document.
L. E. Fennern et al, "1000 MWE Natural Circulation BWR with Passive Safety Features," Nov. 4-7 1991, p. Cover, copyright, 369-373; JSME/ASME.
General Electric Co., "BWR/6 Fundamentals, Standby Gas Treatment System, Secondary Containment System," Feb. 1, 1980, pp. SGTS Title & 1-6, Figs. 1 & 2; SCS Title & 1-13, Tables 7-9, Figs. 1 & 12.

Primary Examiner—Daniel D. Wasil
Attorney, Agent, or Firm—John S. Beulick

[57] ABSTRACT

A reactor building assembly includes a pressure vessel within a containment vessel surrounded in turn by first and second enclosures defining respective first and second chambers. A method of operation includes channeling fresh air downwardly by gravity through the second chamber and then channeling the fresh air laterally through the first enclosure adjacent to the bottom thereof and into the first chamber. The air is then channeled upwardly by natural buoyancy through the first chamber for cooling the first chamber and mixing with stale air therein. The stale air is then discharged from the first chamber upwardly through the top of the first enclosure to the environs. A building inlet is disposed at the second enclosure top for receiving the fresh air, a building outlet is disposed at the top of the first enclosure for discharging the stale air, and a transfer duct is disposed through the first enclosure adjacent to the bottom thereof for selectively joining in flow communication the first and second chambers for allowing natural convection circulation of the fresh air downwardly through the second chamber, laterally through the transfer duct, and upwardly through the first chamber.

11 Claims, 4 Drawing Sheets

REACTOR BUILDING ASSEMBLY AND METHOD OF OPERATION

The present invention relates generally to boiling water nuclear reactors, and, more specifically, to a reactor building assembly having passive cooling and radiation reduction features.

BACKGROUND OF THE INVENTION

A conventional boiling water reactor (BWR) includes a reactor pressure vessel containing a nuclear core for generating steam, with the pressure vessel being disposed inside a containment vessel capable of withstanding elevated pressures and temperatures for preventing significant radiation release in the event of an accident, such as a loss of coolant accident (LOCA). A shield building or other building structure encloses the containment vessel and provides a secondary barrier for further preventing release of radiation during the accident. The shield building used for more recent plants provides an annular plenum surrounding the containment vessel for the collection and filtration of radioactive fission product leakage from the containment vessel that may occur following an accident. The plenum annulus is normally kept at a negative pressure relative to atmospheric pressure so any leakage through the shield building or containment is into this plenum. Under accident conditions, the ventilation exhaust from this plenum is automatically diverted through a filtered standby gas treatment system (SGTS) before release to the environs.

The SGTS is a safety grade, active system typically using alternating electrical current power for driving redundant exhaust fans for drawing the contaminated air from the shield building annulus for filtering through conventional filter trains. The SGTS also includes associated heat removal fans, dampers, ducting and controls required to initiate action which will provide timely protection against the consequences of the release of airborne radioactive materials. The power supplies to this system allow uninterrupted operation during a loss of offsite power.

During an abnormal reactor condition such as the LOCA, a reactor scram is effected to stop power production from the reactor. However, steam generation continues at a reduced rate due to the core fission product decay heat. And, blowdown of steam from the reactor pressure vessel into the water pools within the containment vessel causes the containment vessel to be heated. Little heat is conducted through the containment vessel for the first several days following the accident since the walls of the containment vessel typically include concrete of about 2 meters thickness which has low thermal conductivity. Accordingly, several conventional additional systems are provided for suitably removing heat from within the containment vessel to prevent undesirable elevated temperatures and pressures therein.

In simplified boiling water reactor (SBWR) designs being designed, passive features are being considered for safety-related functions. A passive feature is one which does not rely on external power, such as alternating current (AC) electrical power, being provided for it to function. For example, following a LOCA, the residual heat generated from the reactor core is slowly conducted through the containment vessel which raises the temperature of the surrounding building regions. Heat generation also occurs from leakage of steam through containment pentrations as well as from radioactive decay of fission products postulated to be present in the steam. In one SBWR design, it is postulated that the resulting increase in temperatures due to this heat buildup may be acceptable for a few days following the accident without the need for active systems such as the SGTS, or the typical heating, ventilation, and air conditioning (HVAC) system using AC electrical power for cooling required portions of the reactor building. On a shorter time scale, heat generation also occurs from conventional equipment contained in typical reactor building rooms adjacent to the containment vessel which generate heat as they operate, such as various types of electrical motors.

Some commercial utilities, however, have expressed a desire that a SBWR have more than a few day capability to maintain safe plant operating conditions using solely passive features. Such features include obtaining acceptable cooling of the reactor plant as well as preventing unacceptable levels of leakage radiation from the plant. Some commercial utilities are requiring a capability as good as the best capability achievable from current BWRs using active safety systems. Therefore, additional capability using passive features is desired to extend the time frame to ensure equipment survival by limiting ambient air heatup, typically to a maximum of about 55° to 65° C., and to reduce the offsite radiation or dose leakage to as low as is reasonably achievable.

Objects of the Invention

Accordingly, one object of the present invention is to provide a new and improved reactor building assembly.

Another object of the present invention is to provide a reactor building assembly and method of operation for providing passive cooling and passive reduction of radioactive particle release from the plant.

Summary of the Invention

A reactor building assembly includes a pressure vessel within a containment vessel surrounded in turn by first and second enclosures defining respective first and second chambers. A method of operation includes channeling fresh air downwardly by gravity through the second chamber and then channeling the fresh air laterally through the first enclosure adjacent to the bottom thereof and into the first chamber. The air is then channeled upwardly by natural buoyancy through the first chamber for cooling the first chamber and mixing with stale air therein. The stale air is then discharged from the first chamber upwardly through the top of the first enclosure to the environs. A building inlet is disposed at the second enclosure top for receiving the fresh air, a building outlet is disposed at the top of the first enclosure for discharging the stale air, and a transfer duct is disposed through the first enclosure adjacent to the bottom thereof for selectively joining in flow communication the first and second chambers for allowing natural convection circulation of the fresh air downwardly through the second chamber, laterally through the transfer duct, and upwardly through the first chamber.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
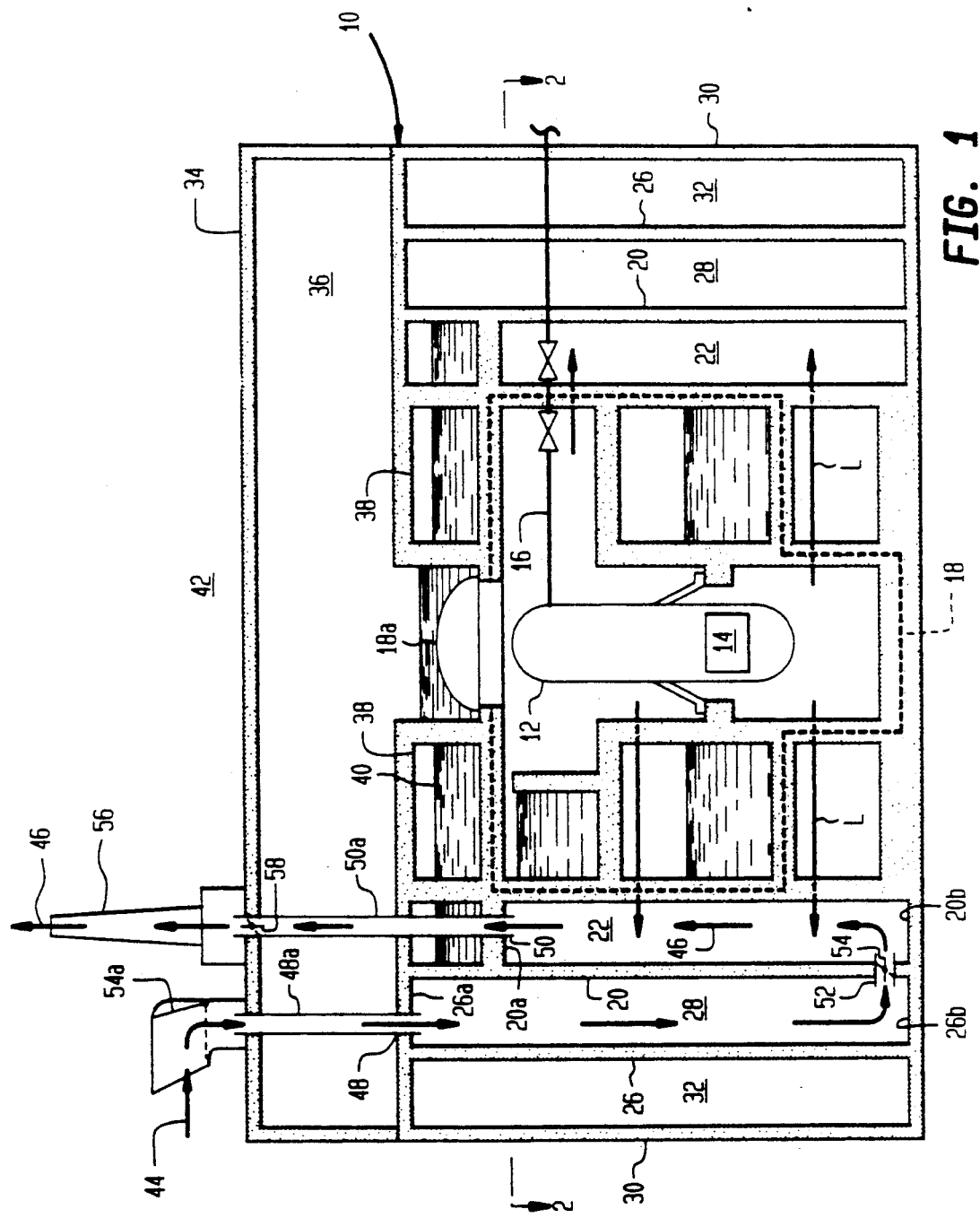
FIG. 1 is a schematic, elevation, partly sectional view of a reactor building assembly in accordance with one embodiment of the present invention.
Figure 2:
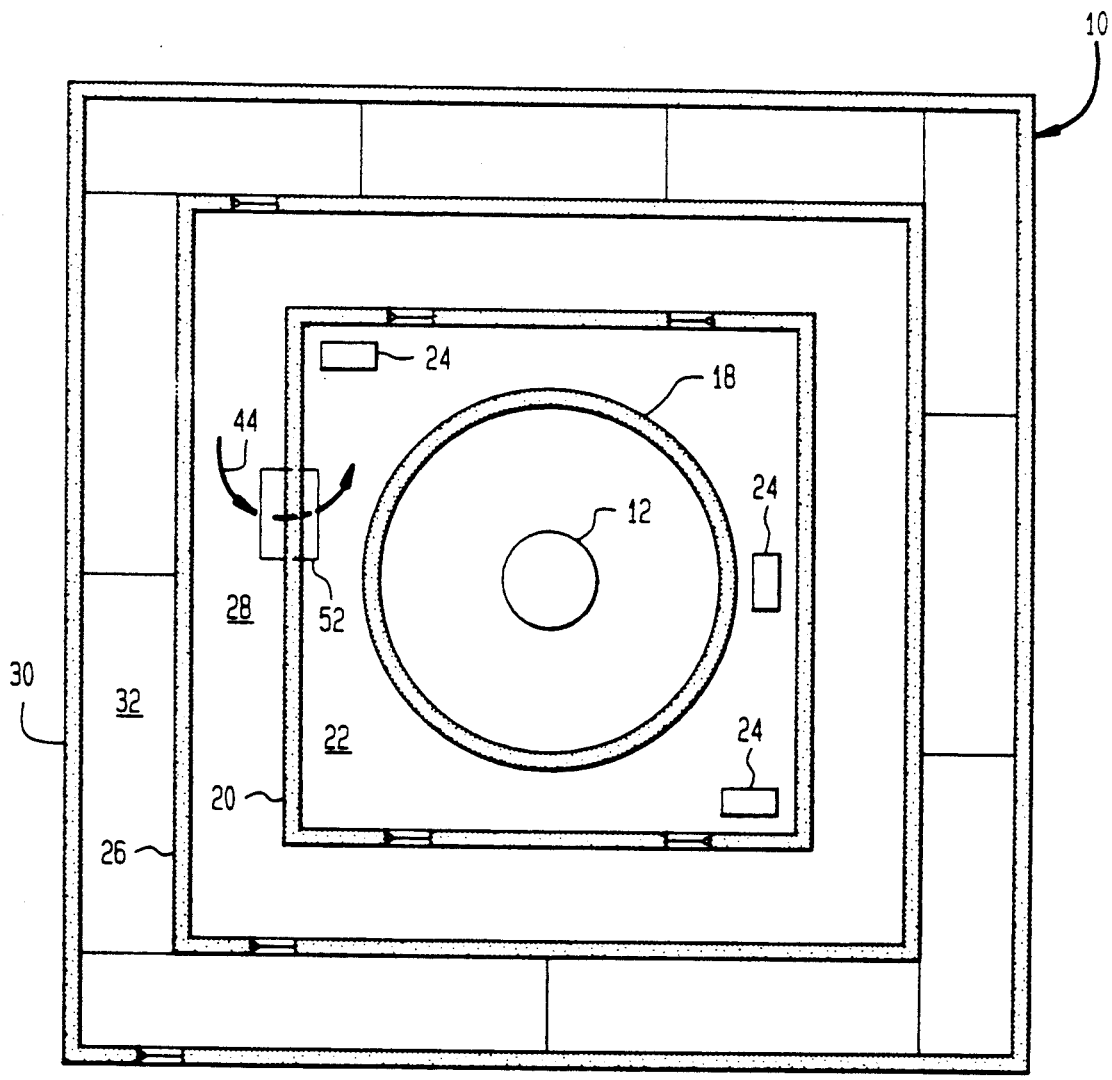
FIG. 2 is a transverse, plan view of the reactor building assembly illustrated in FIG. 1 taken along line 2—2.

Illustrated in FIGS. 1 and 2 is an exemplary reactor building assembly 10 in accordance with an exemplary embodiment of the present invention. The assembly 10 includes a conventional reactor pressure vessel 12 containing a conventional boiling water reactor core 14 for generating heat in the form of steam which is conventionally discharged from the pressure vessel 12 through a main steam outlet line 16, which is suitably connected to a steam turbine (not shown) for driving an electrical generator (not shown) for generating power in a power plant.

A conventional containment vessel 18 fully encloses the pressure vessel 12 and is spaced therefrom for providing conventional compartments for typical water pools and equipment as is conventionally required. The containment vessel 18 may be conventionally formed of suitably thick, steel lined, concrete walls which surround the pressure vessel 12 as indicated by the dashed line 18. A conventional water covered dome 18a forms a part of the upper containment vessel 18 which is removable for allowing access to the pressure vessel 12.

A first enclosure 20 surrounds the containment vessel 18 and is laterally spaced therefrom to define an annular first chamber 22 therebetween. The first enclosure 20 is in the exemplary form of concrete walls forming a generally square enclosure surrounding the containment vessel 18. The first chamber 22 may contain suitable partitions therein (not shown) for defining suitable rooms for containing various auxiliary equipment including safety-related equipment 24 which include electrical motors which generate heat during operation. The first chamber 22 may be alternatively referred to as a safety envelope since it immediately surrounds the containment vessel 18 and provides the first barrier against radiation leakage therefrom as well as containing the safety equipment 24.

The first enclosure 20 includes a top 20a at an elevated position above a bottom 20b so that the first chamber 22 may extend in elevation from below to above the pressure vessel 12. Although the first chamber 22 may include suitable rooms as required for containing equipment, for example, the first chamber 22, in the preferred embodiment, provides a continuous unobstructed flowpath from its bottom 20b to its top 20a for allowing unobstructed airflow therebetween. This may be accomplished by providing the unobstructed opening as illustrated schematically in FIG. 1, or by providing grated floors at various elevations which allow unobstructed airflow therethrough, or by providing suitable conventional ducts for allowing the upward travel of airflow.

A second enclosure 26 surrounds the first enclosure 20 and is laterally spaced therefrom to define an annular second chamber 28 therebetween. The second enclosure 26 is also in the form of concrete walls configured in a generally square arrangement surrounding the first enclosure 20 so that the second chamber 28 is in the exemplary form of a square annulus surrounding the first enclosure 20.

The second enclosure similarly includes a top 26a disposed at an elevation above a bottom 26b, so that the second chamber 28 extends in elevation from below to above the pressure vessel 12 and generally coextensively in elevation with the first chamber 22. Again, the second chamber 28 may include various partitions therein (not shown) for forming suitable rooms for containing equipment or for merely providing access around the first enclosure 20, and may, therefore, be alternatively referred to as a corridor. The second chamber 28 like the first chamber 22 preferably provides an unobstructed airflow path from its top 26a to its bottom 26b which may be effected by providing a generally open second chamber 28 as illustrated schematically in FIG. 1. Similarly, any rooms which may be provided within the second chamber 28 may include grated floors for allowing unobstructed vertical airflow therethrough, or suitable ducts may be provided for allowing unobstructed airflow from the top 26 to the bottom 26b.

In the exemplary embodiment of the invention illustrated in FIG. 1, a third enclosure 30 forming the outer wall of the reactor building assembly 10 is provided which may also be in the form of concrete walls surrounding the second enclosure 26 and laterally spaced therefrom to define a third annular chamber 32 therebetween. The third enclosure 30 also has a generally square configuration in this exemplary embodiment, with the third chamber 32 forming a generally square annulus surrounding the second enclosure 26. The third chamber 32 may include suitable partitions therein as illustrated in FIG. 2 defining various rooms therein as required.

All of the three enclosures 20, 26, 30 and any rooms therein may have any required apertures therethrough for access doors, plumbing, and electrical wiring, for example, as conventionally required, although access may be restricted and controls, including automatic closure, may be applied to assure the proper functioning of this invention.

Disposed above the containment vessel 18 and the first, second, and third enclosures 20, 26, and 30 is a conventional roof 34 which provides a top chamber 36 providing access to the structures below which include conventional equipment such as cranes (not shown) conventionally used for servicing the boiling water reactor. Disposed above the containment vessel 18 are conventional pools of water including, for example, an isolation pool 38 containing isolation pool water 40 therein. The several pools provided in the reactor building assembly 10 are conventional for providing various functions, with the pools disposed above the containment vessel 18 providing one barrier against the release of radiation upwardly therefrom to the environs 42 or atmosphere surrounding the reactor building assembly 10, with the bottom of the assembly 10 providing another barrier against the downward release of radiation into the ground.

In accordance with the present invention, lateral, or sideways release of radiation from the containment vessel 18 is reduced by providing at least the first and second enclosures 20 and 26 as radiation barriers as described in more particularity below. Firstly, however, the first and second enclosures 20 and 26 are effective for passively cooling the containment vessel 18 following a loss of coolant accident (LOCA), for example. The present invention provides for cooling and radiation leakage, i.e. dose, reduction by predeterminedly admitting fresh air 44 from the environs 42 into the reactor building assembly 10, and by discharging filtered, heated, stale air 46 from the reactor building assembly 10 at an elevated position. Since the fresh air 44 is at outside ambient temperature, its admittance provides cooling of the first chamber 22 including the outside of the containment vessel 18 and the equipment, such as the safety equipment 24, within the first chamber 22. Since the hotter air inside the first chamber 22 is preferably filtered and then purged at an elevated position, its release results in dose reduction relative to a nonfiltered, ground level release through reactor building leakage paths.

More specifically, the first and second chambers 22 and 28 are provided for practicing a method of passively cooling the first chamber 22 which is being heated by the containment vessel 18 and by any heat generating safety equipment 24 operating following the LOCA condition, for example. Following the LOCA condition, blowdown of steam within the containment vessel 18 heats the walls of the containment vessel 18 with the heat being conducted therethrough into the first chamber 22. Some of the safety equipment 24 may also generate heat following the LOCA condition further heating the first chamber 22. The stale air 46 contained in the first chamber 22, therefore, is heated and rises by natural convection upwardly toward the first enclosure top 20a.

Furthermore, although the containment vessel 18 is designed to be as leakproof as possible, some leakage from inside the containment vessel 18 into the first chamber 22 will nevertheless occur, which leakage is postulated to contain radioactive particles. Following the LOCA, the temperature and pressure inside the containment vessel 18 will increase which will drive leakage outwardly through any cracks and possibly through penetrations present in the containment vessel 18 as indicated by leakage paths designated L in FIG. 1. The containment vessel 18 may be conventionally designed to be substantially leaktight by minimizing leakage therethrough to no greater than about 0.5% leakage by volume per day.

Heat from this leakage, as well as the heat conducted outwardly through the containment vessel 18 into the first chamber 22, and the heat generated from the safety equipment 24 therein will heat the stale air 46 within the first chamber 22 over the course of a few days, for example, to an undesirably high temperature, which therefore requires cooling of the first chamber 22.

In accordance with one object of the present invention, a method of cooling the first chamber 22 includes the steps of channeling the fresh air 44 from the environs 42 outside the second enclosure 28 downwardly by gravity through the second chamber 28, and then channeling the fresh air 44 from the second chamber 28 laterally through the first enclosure 20 adjacent the bottom 20b and into the first chamber 22 at its bottom. The method further includes channeling the fresh air 44 upwardly by natural convection buoyancy through the first chamber 22 for cooling the first chamber 22, including the safety equipment 24 and the outer wall of the containment vessel 18, and mixing with the stale air 46 therein. The fresh air 44 is, therefore, heated by the elevated temperatures within the first chamber 22 and mixes with the stale air 46 therein and naturally rises. Since cold air has a greater density than hot air, the cold, fresh air 44 falls by gravity within the second chamber 28, and the relatively hot stale air 46 rises within the first chamber 46 for providing natural convection circulation thereof. This natural circulation may be used in accordance with the present invention to provide passive cooling of the first chamber 22 without the need for any active, or externally powered driving fans, for example. The method further includes discharging the heated stale air 46 from the first chamber 22, which now includes the previously fresh air 44 mixed therewith which is no longer fresh, with the stale air 46 being discharged from the first chamber 22 upwardly through the first enclosure top 20a to the environs 42. The method further preferably includes filtering the stale air 46 discharged from the first chamber 22 to remove radioactive particles therefrom to desirably low levels prior to discharge from the reactor building assembly 10 as described in further detail below.

In order to effect the desired passive, natural circulation flowpath through the reactor building assembly, at least one building inlet 48, and more as desired, is preferably disposed at the second enclosure top 26a for receiving into the second chamber 28 the relatively cool, ambient fresh air 44 from the environs 42 outside the second enclosure 26. At least one building outlet 50 is preferably disposed at the first enclosure top 20a for discharging the stale air 46 from the first chamber 22 into the environs 42. At least one transfer duct 52, and more as desired, is preferably disposed through the first enclosure 20 adjacent the bottom 20b thereof for selectively joining in flow communication the first and second chambers 22 and 28 to channel the fresh air 44 from the second chamber 28 and into the first chamber 22.

Since the first chamber 22 is closest to the containment vessel 18 and is insulated by the second chamber 28, it will heat up more than the second chamber 28 due to the leakage of steam and radioactive particles through containment cracks and penetrations and due to the heat conduction through the containment vessel 18 following a LOCA condition, for example, and, furthermore, from the release of heat from operation of the safety equipment 24 therein. Therefore, it is the best candidate for the final discharge flowpath to a filtered, elevated release point since the stale air 46 contained therein would be relatively hotter than the air in the second chamber 28, and therefore more buoyant. The preferred air intake flowpath is the second chamber 28 over the third chamber 32 since the former is smaller in volume and protected from windloads by the latter and may be constructed more readily to a predetermined low leakage rate.

Since the first and second chambers 22 and 28 are being provided in accordance with the present invention as airflow paths, undesirable leakage therefrom should be reduced to ensure maximum efficiency of channeling the fresh and stale air 44, 46 therethrough. Air leakage through the respective first, second, and third enclosures 20, 26, and 30 can be conventionally controlled by providing suitable wall construction materials such as concrete, or metal, with any access doors therein having suitable seals, and with electrical and plumbing lines being suitably sealed, for example. It is preferred that the first enclosure 20 is provided with a relatively leaktight first leakage level of no greater than about 25% leakage by volume per day which is substantially greater than the 0.5% leakage by volume per day typically provided for the containment vessel 18. The second enclosure 26 may be conventionally constructed for obtaining a second leakage level which may be greater than the first leakage level of the first enclosure 20, and may be, for example, about 50% leakage by volume per day. And, the third enclosure 30 may be conventionally constructed for obtaining a third leakage level greater than the second leakage level of the second enclosure 26, which may be, for example, about 100% leakage by volume per day. By suitably constructing the first and second enclosures 20 and 26, channeling of the fresh air 44 and the stale air 46 therethrough without significant loss may be obtained for maximizing the natural convection circulation flow therethrough. In an alternate embodiment, the fresh air 44 could be channeled through the third chamber 32 and laterally through one or more suitable transfer ducts (not shown) through the second chamber 28 and into the first chamber 22, if desired.

To maximize the natural convection circulation flow, the building inlet 48 is disposed as high as possible such as at the second enclosure top 26a, and the building outlet 50 is also disposed as high as possible such as at the first enclosure top 20a to increase the driving force due to gravity falling of the relatively cold and dense fresh air 44 and the natural buoyancy upwardly of the heated stale air 46. The transfer duct 52 is preferably disposed as low as possible such as adjacent the first enclosure bottom 20b for allowing the fresh air 44 to flow downwardly by gravity through the second chamber 28, and then through the transfer duct 52 from the second chamber 28 laterally through the first enclosure 20 and into the first chamber 22 for flow upwardly through the first chamber 22 for the cooling thereof and for mixing with the stale air 46 prior to discharge from the building outlet 50 into the environs 42.

Before and immediately after a design basis accident, such as the LOCA, the first and second chambers 22 and 28 would be at approximately the same, room temperature. At the same temperature, no natural circulation driving force will exist. Therefore, in the preferred embodiment, means in the form of a conventional first damper 54 are provided for selectively blocking and unblocking airflow between the first and second chambers 22 and 28. The first damper 54 may be disposed, for example, inside the transfer duct 52 and would be conventionally positioned to close the transfer duct 52 (as shown in dashed line) for blocking flow therethrough to prevent backflow of the stale air 46 from the first chamber 22 into the second chamber 28. Since the stale air 46 in the first chamber 22 will be undergoing heating and will contain radioactive leakage, it is desirable to prevent its backflow through the transfer duct 52 into the second chamber 28. However, once the stale air 46 is heated to a predetermined level to ensure its upward rise by natural convection, the first damper 54 may be conventionally opened (as shown in solid line) for unblocking flow through the transfer duct 52 to allow unobstructed forward flow through the transfer duct 52 from the second chamber 28 into the first chamber 22.

The relatively cool fresh air 44 will then provide a downward driving force in the second chamber 28 to ensure the forward flow through the transfer duct 52 and into the first chamber 22. In an alternate embodiment, the first damper 54 could also be installed at a suitable location in the building inlet 48 as indicated at 54a (Damper shown in solid line in an open position and in dashed line in a closed position.)

The first damper 54 may take any conventional form including the flapper-type valves illustrated, and may be conventionally automatically opened using stored motive power, such as air pressure from an accumulator, or direct electrical current from a battery, or electrical AC power if available, or they could be opened manually if necessary. The first damper is normally closed and need be open only once, following the LOCA for example, to allow the natural circulation through the transfer duct 52. Of course, any doors or other access holes between the first and second chambers 22, 28 would normally be closed to ensure that the primary flowpath through the first and second chambers 22, 28 is that for effecting the natural circulation of the fresh air 46 and stale air 44 therethrough.

In order to further increase the natural convection driving force through the first and second chambers 22 and 28, a conventional elongated exhaust stack 56 may be disposed on the roof 34 for discharging the stale air 46 at a higher elevation. The exhaust stack 56 as illustrated in FIG. 1 is preferably disposed above the building outlet 50 on the roof 34 and in flow communication with the outlet 50 for channeling upwardly the stale air 46 from the first chamber 22 for discharge into the surrounding environs 42.

As illustrated in FIG. 1, the building inlet 48 includes a suitable inlet conduit 48a extending from the second enclosure top 26a and out through the roof 34. The building outlet 50 similarly includes a conventional outlet duct 50a extending from the first enclosure top 20a and through the roof 34 in flow communication with the exhaust stack 56. A second damper 58 may be disposed in the outlet duct 50a for selectively blocking and unblocking flow therethrough. The second damper 58 is illustrated in solid line in an open position, and in dashed line in a closed position, and may be used in addition to or instead of the first damper 54 to predeterminedly open when the stale air 46 is suitably heated to ensure its natural convection upwardly through the exhaust stack 56 without backflow through the transfer duct 52.

Accordingly, the first and second chambers 22 and 28 provide effective flowpaths for providing natural circulation of the fresh air 44 downwardly and the stale air 46 upwardly for passively cooling the first chamber 22 including the outer walls of the containment vessel 18. The first and second enclosures 20 and 26 provide additional barriers against radiation leakage from the containment vessel 18 and define the first and second chambers 22 and 28 to contain radiation leakage and effect dose reduction by passive means. For example, the several chambers, i.e., 22, 28, and 32 provide passive dose reduction by holdup, or the temporary containment of radioactive leakage which allows half-life degradation thereof. Furthermore, passive dose reduction also occurs from plateout when the radioactive particles settle on the various surfaces within the chambers 22, 28, and 32, thereby preventing their further escape from the reactor building. Furthermore, the several pools contained within the reactor building provide dilution of the leaking radioactive particles which trap the particles within the pools and prevent their further escape. Holdup, dilution, and plateout are conventionally known passive techniques for reducing radiation leakage, but the three chambers 22, 28, and 32 provide an increased volume and surface area and additional barriers for further improving holdup and plateout reduction of radiation leakage from the reactor building.

Figure 3:
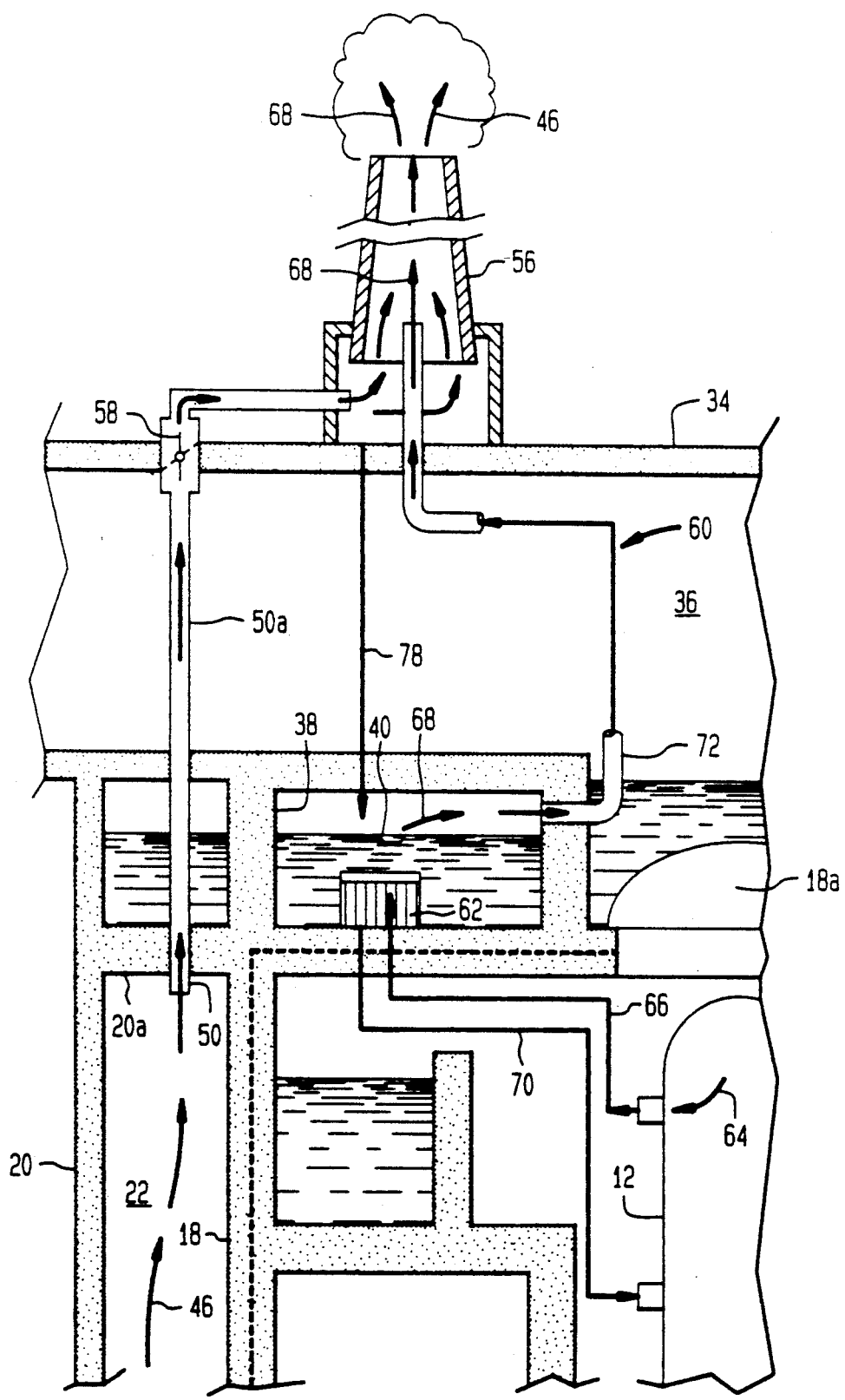
FIG. 3 is a schematic, elevation, partly sectional view of a reactor building assembly in accordance with a second embodiment.

Referring to FIG. 3, the present invention may further include a first driving means indicated generally at 60 for increasing flow of the stale air 46 from the building outlet 50 beyond that provided solely by the natural circulation of the cold fresh air 44 and the hot stale air 46 described above. The first driving means 60 are preferably also passive without the need for external power, which may be operated following the LOCA condition, for example, using solely available energy within the reactor building. In the exemplary embodiment illustrated in FIG. 3, the first driving means 60 include the isolation pool 38 containing the isolation water 40, and an isolation condenser 62 in the form of a conventional heat exchanger is disposed in the isolation pool 38 below the surface of the isolation water 40. The isolation condenser 62 is conventionally joined in flow communication with the pressure vessel 12 for receiving primary steam 64 therefrom through an inlet conduit 66, with the primary steam 64 being cooled in the isolation condenser 62 by the isolation water 40 which is heated thereby to generate secondary steam 68. The primary steam 64 is radioactive, whereas the secondary steam 68 has reduced or no radioactivity since the isolation condenser 62 and isolation water 40 are effective for containing radioactivity. A conventional outlet conduit 70 returns the condensed primary steam 64 as a liquid back to the pressure vessel 12.

The first driving means 60 further includes a conventional supply conduit 72 disposed in flow communication between the isolation pool 38 and the exhaust stack 56 for channeling the secondary steam 68 to the exhaust stack 56 for releasing additional heat inside the exhaust stack 56 for further drawing the stale air 46 from the first chamber 22 through the building outlet 50 and driving the stale air 46 upwardly through the exhaust stack 56. The secondary steam 68 produced from the isolation water 40 can therefore be used to increase convective forces in the exhaust stack 56 for drawing the stale air 46 from the outlet duct 50a. This is done by transferring heat from the secondary steam 68 to the air contained in the exhaust stack 56 which heats the air causing it to rise. As shown in FIG. 3, the secondary steam 68 may be admitted directly into the bottom of the stack 56 where it rises while heating and pulling the stale air 46 from the first chamber 22.

Figure 4:
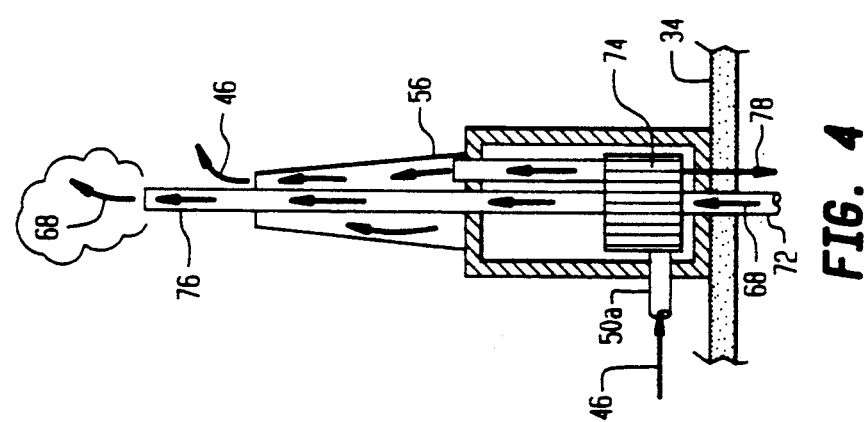
FIG. 4 is a schematic, elevation, partly sectional view of a reactor building assembly in accordance with a third embodiment.

In an alternate embodiment illustrated in FIG. 4, the first driving means 60 further includes a conventional heat exchanger 74 disposed below the exhaust stack 56 inside the base thereof and in flow communication with both the building outlet 50 and the supply conduit 72 and is operable for further heating the stale air 46 by the secondary steam 68 prior to discharge from the exhaust stack 56 for drawing the stale air 46 from the first chamber 22. The outlet duct 50a is conventionally joined to the heat exchanger 74 so that the stale air 46 may be heated inside the heat exchanger 74 by the secondary steam 68, with heated stale air 46 being discharged from the heat exchanger 74 through a stack pipe 76 extending upwardly through the exhaust stack 56 for discharging the secondary steam 68 above the exhaust stack 56 into the environs 42. In both embodiments illustrated in FIGS. 3 and 4, a conventional condensate return conduit 78 returns any condensate from the secondary steam 68 back to the isolation pool 38.

Figure 5:
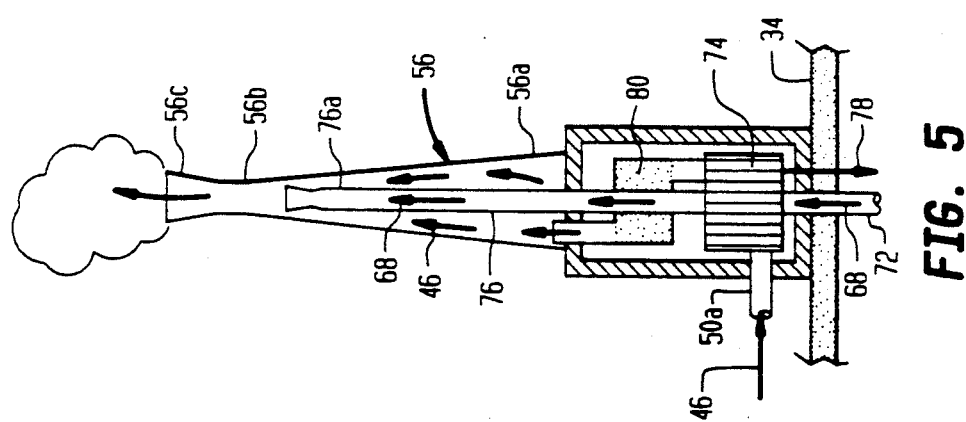
FIG. 5 is a schematic, elevation, partly sectional view of a reactor building assembly in accordance with a fourth embodiment.

FIG. 5 illustrates another embodiment of the exhaust stack 56 which is in the form of an eductor having a base 56a for receiving the stale air 46 from the building outlet 50 and the heat from the secondary steam 68. The stack 56 also includes a throat 56b of minimum flow area disposed in flow communication with the base 56a, and an outlet top 56c having a larger flow area than the throat 56b and disposed in flow communication therewith. Eductors are conventionally know, for example for increasing circulation of water inside the pressure vessel 12. They conventionally operate by transferring the kinetic energy from a driving fluid, such as the secondary steam 68, into the driven fluid, such as the stale air 46, for drawing the driven fluid through the eductor. In the embodiment illustrated in FIG. 5, the stack pipe 76 includes an outlet 76a in the form of a conventional nozzle which serves to control the pressure of the secondary steam 68 and increases the kinetic energy of the secondary steam 68 discharged therefrom, which kinetic energy is then transferred to the stale air 46 upstream of the throat 56b for mixing therewith, with the mixture then being diffused from the throat 56b to the outlet top 56c for discharge into the environs 42. For the purpose of achieving optimum performance, the stack 56 may consist of one or more eductors as appropriate.

Furthermore, the circulation flowpath provided by the first and second chambers 22 and 28 additionally allows for passive filtering of the stale air 46 to remove radioactive particles therefrom prior to discharge from the exhaust stack 56. In order to reduce radioactive particles from being discharged from the reactor building with the stale air 46, a conventional filter 80 may be provided in a suitable location such as within the base of the exhaust stack 56 as illustrated in one embodiment in FIG. 5. It is desirable to filter the stale air 46 after its discharge from the first chamber 22 and before its discharge into the environs 42 through the exhaust stack 56 to allow unobstructed flow through the first chamber 22. The filter 80 is, therefore, preferably disposed in flow communication between the building outlet 50 and the exhaust stack 56 for filtering radioactive particles from the stale air 46 prior to discharge from the exhaust stack 56. The filter 80 may be a conventional charcoal filter for filtering radioactive particles from the stale air 46 and may be disposed in flow communication with the heat exchanger 74 for receiving the heated stale air 46 therefrom for improving efficiency of operation of the filter 80. As shown in FIG. 5, the stale air 46 is channeled through one circuit of the heat exchanger 74 wherein it is heated by the secondary steam 68 being channeled through the second circuit thereof, with the heated stale air 46 then being discharged through the filter 80 to filter radioactive particles therefrom, with the clean, heated stale air 46 then being discharged into the exhaust stack 56. Since the steam 68 is channeled independently of the stale air 46 through the heat exchanger 74, the stale air 74 remains relatively dry, and the filter 80 may use conventional charcoal for effective filtering. However, for embodiments wherein the stale air 46 has an elevated moisture content, the filter 80 may use alternate conventional materials such as silver zeolyte.

Since the filter 80 effects a pressure drop thereacross, the first driving means 60, including for example the eductor 56 shown in FIG. 5 is preferred to ensure that an adequate driving force is provided to both circulate the fresh air 44 and the stale air 46 through the second and first chambers 28 and 22, respectively, and for driving the stale air 46 through the filter 80 into the environs 42 through the exhaust stack 56.

Figure 6:
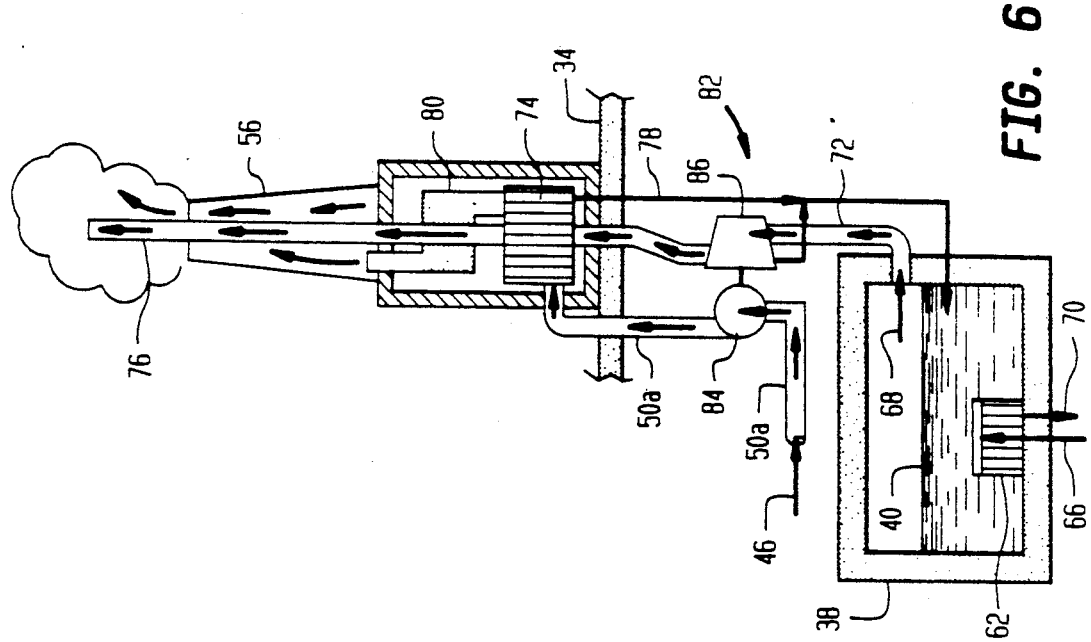
FIG. 6 is a schematic, elevation, partly sectional view of a reactor building assembly in accordance with a fifth embodiment.

As an alternate means to apply driving force to move the stale air 46 from the first chamber 22, a second driving means 82 as illustrated in FIG. 6 may be additionally used for increasing flow of the stale air 46 from the building outlet 50 and through the exhaust stack 56. The second driving means 82 in an exemplary embodiment includes a conventional pump or fan 84 disposed in flow communication inside the building outlet conduit 50a for pumping the stale air 46 from the first chamber 22 and into the exhaust stack 56. A conventional steam turbine 86 is operatively joined to the fan 84 for rotating the fan 84 to drive the stale air 46 through the outlet conduit 50a. The steam turbine 86 is preferred for powering the fan 84 since it may use the secondary steam 68 from the isolation pool 38 for its motive power, thereby providing passive operation without the need for an external power supply. The steam turbine 86 is preferably disposed in flow communication between the isolation pool 38 and the exhaust stack 56 in series flow in the supply conduit 72 for first receiving the secondary steam 68 from the isolation pool 38 for powering the turbine 86, with the secondary steam 68 then being discharged from the turbine 86 continuing through the supply conduit 72 to the heat exchanger 74 in the exhaust stack 56. The turbine 86 has a condensate return line which joins with the return conduit 78 for returning liquid condensate back to the isolation pool 38. The isolation pool 38 may be pressurized above atmospheric pressure to limit such condensation in the turbine 86 consistent with its primary function to remove decay heat from the reactor.

In the embodiment illustrated in FIG. 6, driving force for channeling the fresh air 44 and stale air 46 (see FIG. 1) through the second and first chambers 28 and 22, respectively, is provided firstly by natural convection due to the density differences between the cold fresh air 44 and the hot stale air 46; secondly by the first driving means 60 which heats the stale air 46 within the heat exchanger 74 for adding to its natural convection buoyancy; and thirdly by the second driving means 82 which pumps the stale air 46 through the fan 84 to the heat exchanger 74 at the base of the exhaust stack 56. In this way, a considerable driving force is provided for pumping the fresh and stale air 44, 46 through the reactor building and upwardly through the exhaust stack 56 and overcoming pressure drop losses of the filter 80. Of course, various embodiments of the invention may be provided by using any of the above described features either alone or in various combinations thereof for channeling the fresh air 44 through the reactor building for cooling the first chamber 22 and, secondarily, providing the filter 80 for removing radioactive particles from the stale air 46 prior to discharge from the exhaust stack 56.

In all embodiments, additional fans or blowers (not shown) driven by conventional AC power may be configured in series or parallel to the described flow path for removing the stale air 46 without comprising the passive functioning of the system. Such fans or blowers provide the normal driving force when AC power is available, and are preferably powered from the same AC power source used to operate equipment which provides normal cooling of the isolation pool 38 to preclude release of steam therefrom. Upon loss of all AC power sources for this function, simultaneously with reactor and containment isolation, the isolation pool 38 boils and the reactor building assembly and system described herein function to provide passive reactor building cooling and dose reduction.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A reactor building assembly comprising:
  a reactor pressure vessel containing a reactor core for generating heat in the form of steam;
  a containment vessel enclosing said pressure vessel;
  a first enclosure surrounding said containment vessel and spaced laterally therefrom to define a first chamber therebetween, and having a top and a bottom;
  a second enclosure surrounding said first enclosure and spaced laterally therefrom to define a second chamber therebetween, and having a top and a bottom;
  a building inlet for receiving into said second chamber fresh air from outside said second enclosure;
  a building outlet for discharging stale air from said first chamber;
  a transfer duct disposed through said first enclosure selectively joining in flow communication said first and second chambers;
  said building inlet being disposed at said second enclosure top, said building outlet being disposed at said first enclosure top, and said transfer duct being disposed adjacent said first enclosure bottom for allowing said fresh air to flow downwardly by gravity through said second chamber and through said transfer duct into said first chamber for cooling said first chamber, said stale air flowing upwardly by natural buoyancy for discharge from said first chamber through said building outlet;
  an exhaust stack disposed above said building outlet and in flow communication therewith for channeling upwardly said stale air from said first chamber for discharge into the surrounding environs; and
  a passive first driving means for increasing flow of said stale air from said building outlet comprising:
    an isolation pool containing isolation water;
    an isolation condenser disposed in said isolation pool, and joined in flow communication with said reactor pressure vessel for receiving primary steam therefrom, said primary steam being cooled in said isolation condenser for heating said isolation water to generate secondary steam; and
    a supply conduit disposed in flow communication between said isolation pool and said exhaust stack for channeling said secondary steam to said exhaust stack for releasing heat inside said exhaust stack for drawing said stale air from said first chamber and driving said stale air upwardly through said exhaust stack.

2. A reactor building assembly according to claim 1 further including means for selectively blocking and unblocking airflow through said transfer duct to prevent backflow through said transfer duct from said first chamber into said second chamber, and to allow forward flow through said transfer duct from said second chamber into said first chamber, respectively.

3. A reactor building assembly according to claim 2 wherein said exhaust stack is in the form of an eductor having a base for receiving said stale air from said building outlet and said heat from said secondary steam;
   a throat of minimum flow area disposed in flow communication with said base; and
   a top having a larger flow area than said throat and disposed in flow communication therewith.

4. A reactor building assembly according to claim 2 wherein said first driving means further include a heat exchanger disposed below said exhaust stack and in flow communication with both said building outlet and said supply conduit and operable for further heating said stale air by said secondary steam prior to discharge from said exhaust stack, and for drawing said stale air from said first chamber.

5. A reactor building assembly according to claim 4 further including a filter disposed in flow communication between said building outlet and said exhaust stack for filtering radioactive particles from said stale air prior to discharge from said exhaust stack.

6. A reactor building assembly according to claim 5 wherein said filter is disposed in flow communication with said heat exchanger for receiving said stale air therefrom for heating said filter.

7. A reactor building assembly according to claim 6 further including second driving means for driving flow of said stale air from said building outlet comprising:
   a building outlet conduit joined in flow communication between said building outlet and said exhaust stack;
   a fan disposed in flow communication inside said building outlet conduit; and
   a steam turbine operatively joined to said fan for rotating said fan to drive said stale air through said building outlet conduit to said exhaust stack.

8. A reactor building assembly according to claim 7 wherein said steam turbine is disposed in flow communication between said isolation pool and said exhaust stack for first receiving said secondary steam from said isolation pool for powering said turbine, said secondary steam then being discharged from said turbine to said exhaust stack.

9. A reactor building assembly according to claim 2 further including second driving means for further increasing flow of said stale air from said building outlet comprising:
   a building outlet conduit joined in flow communication between said building outlet and said exhaust stack;
   a fan disposed in flow communication inside said building outlet conduit;
   a steam turbine operatively joined to said fan for rotating said fan to drive said stale air through said building outlet conduit to said exhaust stack; and
   wherein said steam turbine is disposed in flow communication between said isolation pool and said exhaust stack for first receiving said secondary steam from said isolation pool for powering said turbine, said secondary steam then being discharged from said turbine to said exhaust stack.

10. In a reactor building assembly including:
    a reactor pressure vessel containing a reactor core for generating heat in the form of steam;
    a containment vessel enclosing said pressure vessel;
    a first enclosure surrounding said containment vessel and spaced laterally therefrom to define a first chamber therebetween, and having a top and a bottom; and
    a second enclosure surrounding said first enclosure and spaced laterally therefrom to define a second chamber therebetween, and having a top and a bottom;
    a method of cooling said first chamber comprising the steps of:
    channeling fresh air from outside said second enclosure downwardly by gravity through said second chamber;
    channeling said fresh air from said second chamber laterally through said first enclosure adjacent to said bottom thereof and into said first chamber;
    channeling said fresh air upwardly by natural buoyancy through said first chamber for cooling said first chamber and mixing with stale air therein;
    discharging said stale air from said first chamber upwardly through said first enclosure top; and
    discharging steam adjacent to said stale air discharged from said first chamber to draw said stale air therefrom.

11. A method according to claim 10 further including a step of filtering said stale air discharged from said first chamber to remove radioactive particles therefrom prior to discharge from said reactor building assembly.

* * * * *